Feb. 3, 1931.  A. C. BADGER  1,790,787
MACHINE FOR WELDING HOLLOW BODIES UNDER ABNORMAL PRESSURE
Filed May 22, 1929   4 Sheets-Sheet 1
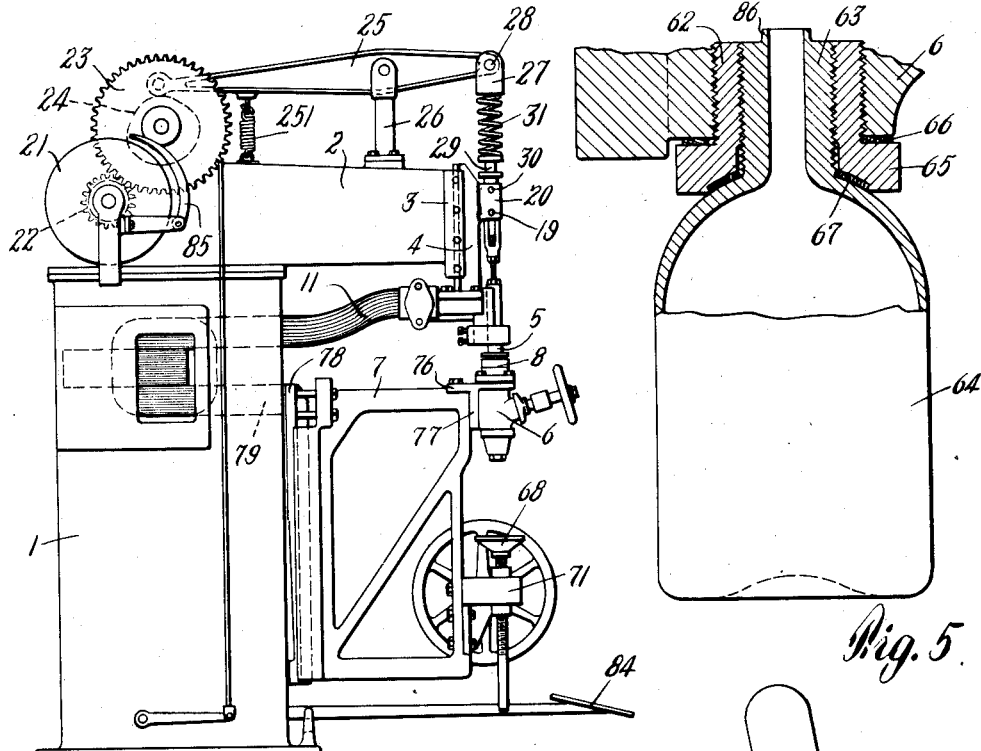
Fig. 1.
Fig. 5.
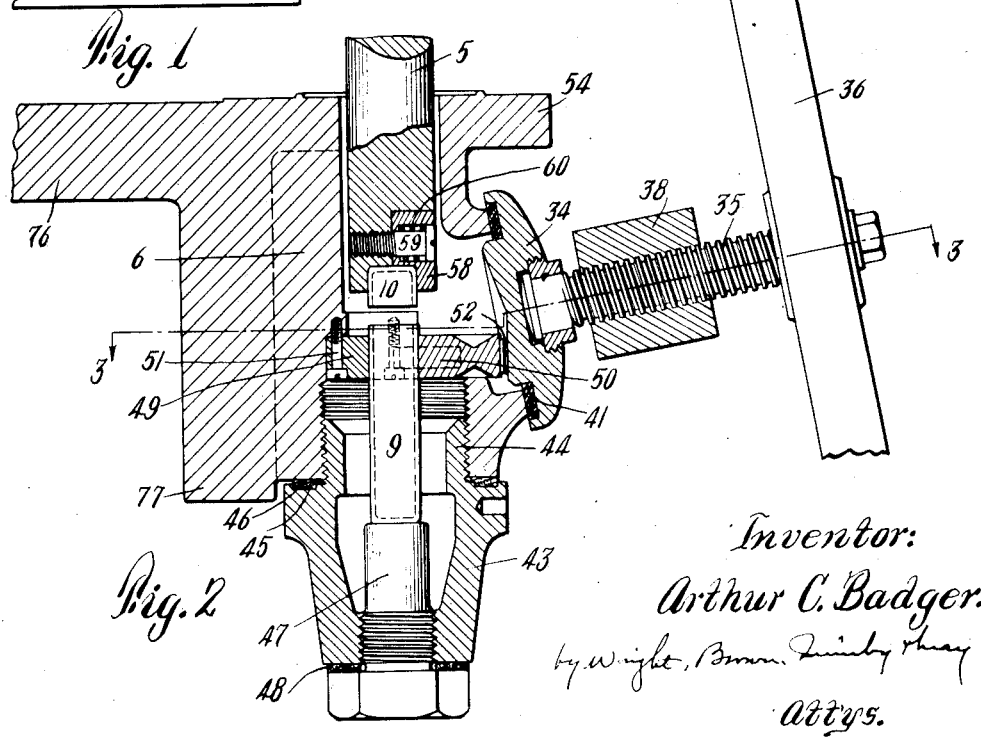
Fig. 2.
Inventor:
Arthur C. Badger.
by Wright, Brown, Quinby Mary
attys.

Feb. 3, 1931.  A. C. BADGER  1,790,787
MACHINE FOR WELDING HOLLOW BODIES UNDER ABNORMAL PRESSURE
Filed May 22, 1929  4 Sheets-Sheet 2

Inventor:
Arthur C. Badger.
by Wright, Brown, Quinby & Shay
Attys.

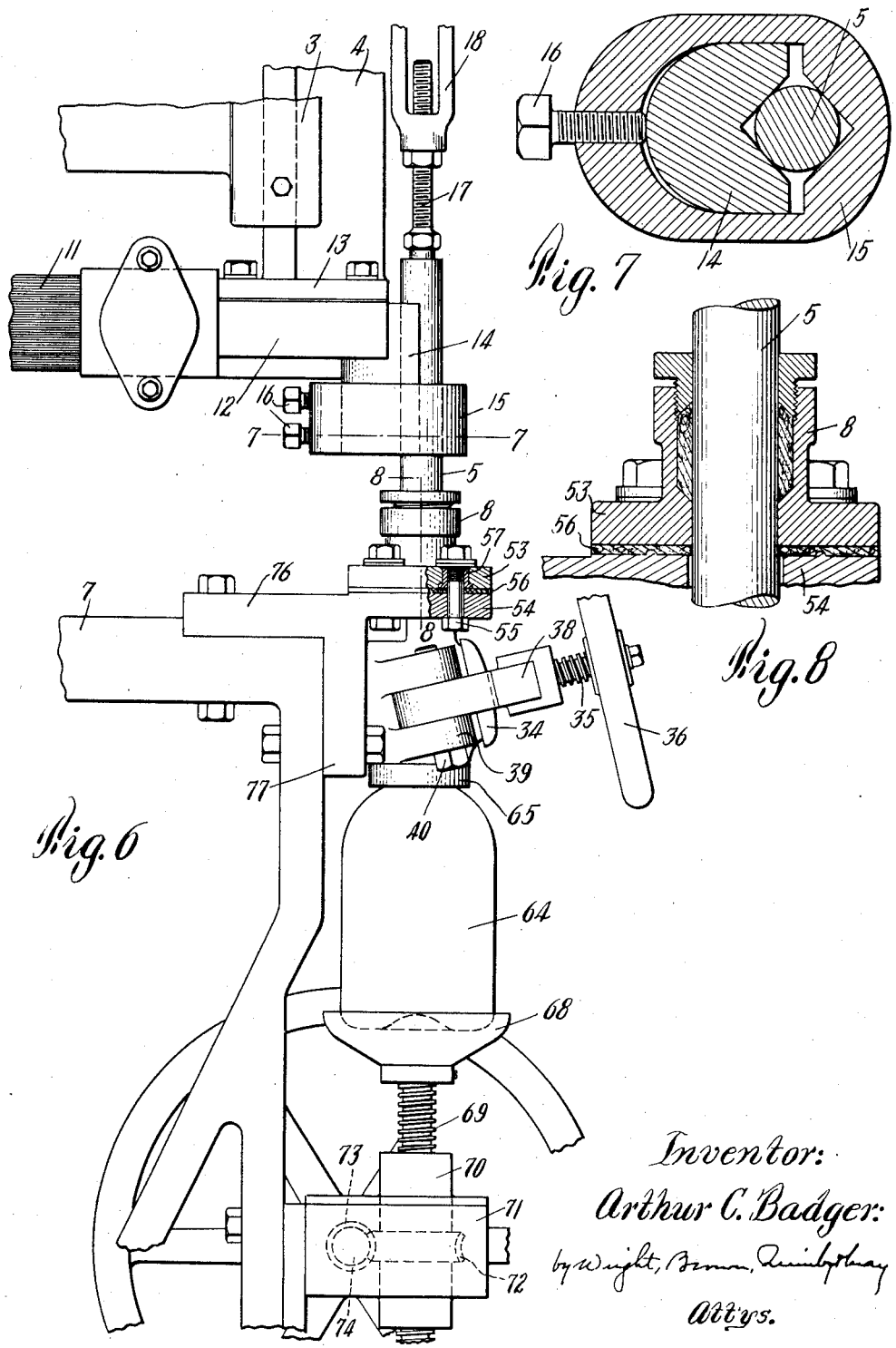

Feb. 3, 1931.  A. C. BADGER  1,790,787
MACHINE FOR WELDING HOLLOW BODIES UNDER ABNORMAL PRESSURE
Filed May 22, 1929  4 Sheets-Sheet 4
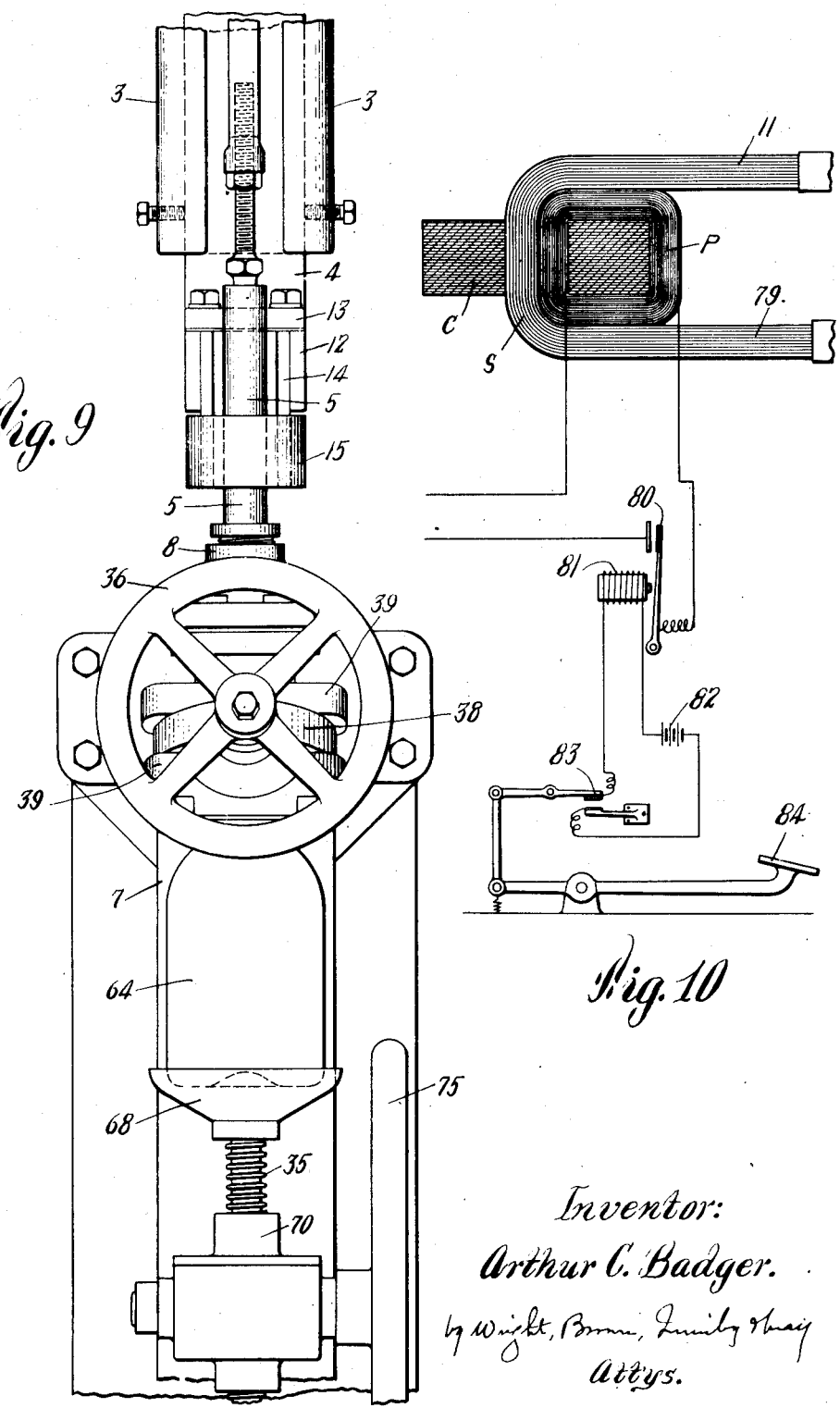
Inventor:
Arthur C. Badger.
by Wright, Brown, Quinby & May
Attys.

Patented Feb. 3, 1931

1,790,787

UNITED STATES PATENT OFFICE

ARTHUR C. BADGER, OF NEWTON, MASSACHUSETTS

MACHINE FOR WELDING HOLLOW BODIES UNDER ABNORMAL PRESSURE

Application filed May 22, 1929. Serial No. 364,981.

The present invention relates to the art of creating abnormal pressures in metallic hollow bodies and sealing the same hermetically by electric welding while subjected externally as well as internally, at the sealing point at least, to such abnormal pressure; which is illustrated generically in my prior application for United States Patent, Serial No. 692,468, filed February 13, 1924, on which Patent No. 1,728,171, was granted Sept. 17, 1929. The term "abnormal" as used here with respect to pressures means pressures other than atmospheric; the atmospheric pressure being taken as the norm for my present purposes. The hollow bodies referred to include cartridges or bottles, or similar containers, holding gas under high pressure for use in fire extinguishers to expel the liquid charge thereof, and for other more or less analogous uses. In my said prior patent I have illustrated in a diagrammatic manner the principles of an apparatus for holding such a metal cartridge or bottle and electrically welding a cover or cap across the filling opening thereof in a closed chamber wherein such an abnormal pressure is maintained. It is my present object to disclose and protect the characteristics and structural details of a commercial machine embodying the same principles, and the invention consists in the novel combinations and elements of such machine, hereinafter described in detail, and in all substantial equivalents thereof.

In the drawings,—

Fig. 1 is a side elevation of a machine embodying this invention;

Fig. 2 is a vertical sectional view on a larger scale of the electrodes and pressure chamber of such machine, showing a metallic cartridge body and cap in position to be united by welding;

Fig. 5 is a fragmentary section of a chambered electrode having a substituted attachment for receiving the mouth of a cartridge or bottle of larger capacity than those shown in Figs. 2 and 4, showing also the bottle in connection therewith;

Fig. 6 is a side elevation on a scale larger than that of Fig. 1, of the electrodes and associated parts of the machine, including the support for a large cartridge of the type shown in Fig. 5;

Fig. 7 is a cross section on line 7—7 of Fig. 6 on a larger scale;

Fig. 8 is a fragmentary vertical section on line 8—8 of Fig. 6;

Fig. 9 is a front elevation of the parts shown in Fig. 6;

Fig. 10 is a diagram of the electrical circuits of the machine.

Like reference characters designate the same parts wherever they occur in all the figures.

Figure 3:
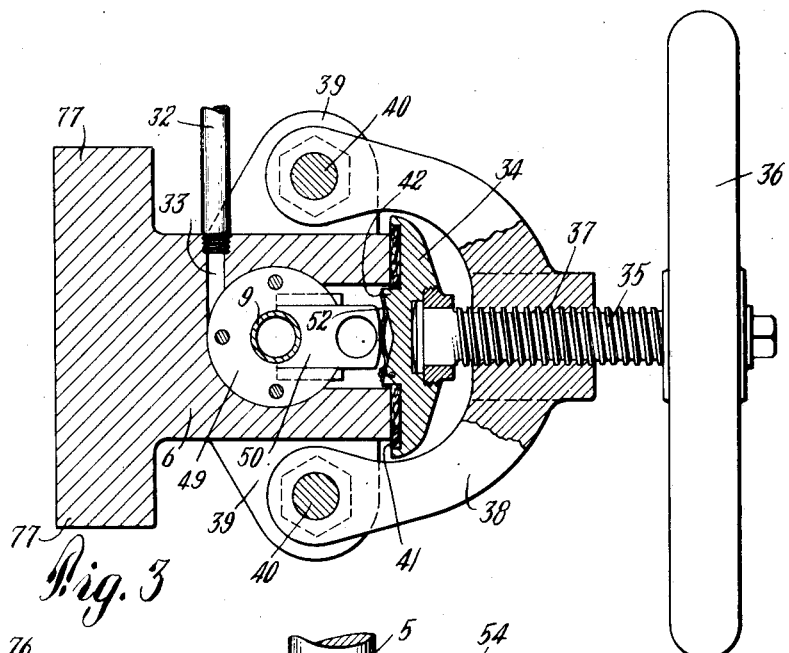
Fig. 3 is a cross section on line 3—3 of Fig. 2.

The machine frame comprises a box-like base or pedestal within which is contained a part of the electrical equipment and on the top of which is a laterally projecting massive and rigid arm 2. This arm is provided on its outer end with a guideway 3 in which there is mounted to move vertically a slide or carrier 4 to which a welding electrode 5 is secured. The complemental electrode 6 is mounted on a rigid frame 7 which is secured to the side of the base beneath arm 2. It is placed in alinement with the electrode 5 and is of hollow formation, having an interior chamber into which the electrode 5 extends through a stuffing box 8. A cartridge or equivalent container of the type shown at 9 in Fig. 2 is adapted to be placed bodily in the electrode 6 and held therein, in electrically conductive connection therewith, while a cap or cover 10, carried by the electrode 5, is brought into engagement with the walls surrounding the open end of the cartridge body and is welded thereto. The cartridge body and its cap or cover are made of iron, steel or other weldable metal or metallic alloy. They are in conductive engagement with the respective electrodes, which in turn are electrically insulated from each other and connected respectively to the terminals of the secondary coil of a transformer.

Such secondary coil, or at least the end of it which is connected to the electrode 5, is made of a group of copper ribbons 11, or equivalent conductors, secured in good conducting connection to a holder 12 which is bolted to flanges 13 on the end of slide 4 and is suitably insulated from the complemental electrode. Holder 12 has a receiving portion 14 vertically grooved along its outer face, in the groove of which the cylindrical copper electrode 5 is placed and against which it is tightly pressed by a clamp 15 which surrounds the receiving portion and the electrode, has a groove to receive the outer side of the electrode, and is pressed against the latter by screws 16 threaded through it and bearing on the part 14 of the electrode holder, as shown in Figs. 6 and 7. This means of securing the electrode to its holder makes effective conducting contact while permitting adjustment of the electrode lengthwise, as needed for the accommodation of cartridges of which the mouths are at a higher or lower level when being sealed.

An adjustable thrust transmitting connection between the electrode and slide 4 is given by a two-part link or thrust bar consisting of a screw rod 17 swiveled to the electrode and having a thrust bearing thereon, and a recessed bar 18 connected by a pin 19 with lugs 20 on the slide and having a threaded socket in which the screw rod 17 is contained. The slide is moved to advance the electrode into welding action by mechanism consisting of a belt pulley 21, a gear 22 on the same shaft with the pulley, a gear 23 in mesh with gear 22, a cam 24 rigidly connected with gear 23, and a lever 25 pivoted on an upright 26 rising from arm 2. One arm of the lever 25 is engaged with cam 24, (and held in contact with it by a spring 25¹), and its other arm is connected with the slide 4 through a block 27 pivoted at 28 to the lever arm, a bar 29 between the lugs 20 of the slide to which it is connected by a pin 30, and a powerful spring 31 between the block and bar; these parts providing a yieldable link or pitman which is compressed when the cap carried by the electrode first comes into contact with the cartridge body, and expands to upset and perfect the weld when the contacting edges of cap and body have become softened by heat.

Describing further the complemental electrode 6, the latter is designed to confine fluid under pressure for filling the cartridge and to prevent escape of the fluid contents of the cartridge while being closed and sealed by welding. The fluid may be supplied by any suitable means, such as a pipe 32 connected to the side of the electrode and a passage 33 extending to its interior chamber from the pipe. The electrode has an opening at one side for admission and removal of cartridges small enough to be placed in it bodily. A cover or door 34 is provided to close such opening and is swiveled on the end of a screw 35, which carries a hand wheel 36 for turning it, and is threaded through a tapped passage 37 in the central part of a yoke 38. The yoke has spreading arms which embrace the chambered part of the electrode and fit between lugs 39 at opposite sides thereof, where they are held by bolts 40. Either of such bolts may be removed from the alined holes in the adjacent yoke arm and lugs, and the other caused to serve as a pivot about which the yoke and cover may be turned aside. The cover has a gasket 41 arranged to bear on the surfaces surrounding the opening, and a central boss 42 of an oblong outline similar to that of the opening, adapted to enter it and prevent rotation of the cover when the screw is turned.

The bottom closure of the electrode chamber is formed by one of a number of interchangeable hollow pieces or plugs screwed into an internally threaded entrance in the piece 6 which constitutes the electrode proper. The closure 43 shown in Fig. 2 has a threaded neck 44 and an abutment shoulder 45 supporting a gasket 46. It is open internally from end to end and contains a detachable plug 47 screwed into its lower end and packed by means of a gasket 48. The piece 43 forms an extension of the chamber and its plug a support for the cartridge to be welded. The latter is clamped, centered in alinement with the electrode 5, and put into good conducting connection with the electrode 6 by a pair of clamps 49 and 50, the former of which is ring shaped, fitted externally to the interior of electrode 6, and secured by screws 51 to an overhanging ledge or shoulder in the electrode. This ring shaped clamp has a slot opening from one side to a central socket formed to fit approximately half of the circumference of the cartridge body, as shown in Fig. 3, and the slot is provided with guideways in which the complemental clamp 50 is adapted to slide, such clamp being recessed at its inner end to embrace and engage the remaining half of the cartridge body and being engageable on its outer end by a spring 52 on the inner side of the cover, so that when the cover is closed the clamp is pressed with a firm spring pressure against the cartridge and the latter is pressed against the other clamp.

The opening into the chambered electrode through which the plunger electrode 5 passes is closed and made leakage tight by the packing in the stuffing box 8. Electrical isolation of the plunger electrode from the chambered electrode is effected by making the stuffing box 8 as a separate piece and the passage in the chambered electrode enough larger than the plunger electrode so that the latter is entirely surrounded by an open space. The stuffing box has a flange 53 which is secured to a flange 54 on the chambered electrode by bolts 55. An insulating washer 56 is inserted between the flanges and insulating bushings 57 surround the several bolts in the flange 53, and insulating washers lie between this flange and the nuts on the bolts.

The plunger electrode is fitted on its inner end with a spring clamp 58 to grasp the cartridge cover or cap and to press upon it firmly enough to make good electrical contact. This clamp is fitted to a recess in the side of the electrode and centered therein by a screw 59. The passage in the clamp through which the screw extends is as large as the head and larger than the shank of the screw and receives a spring 60 which presses on a shoulder at the inner end of the passage and reacts on the screw head. The electrode body at its end and the adjacent part of the clamp are complementally recessed to fit the circumference of the cap.

Figure 4:
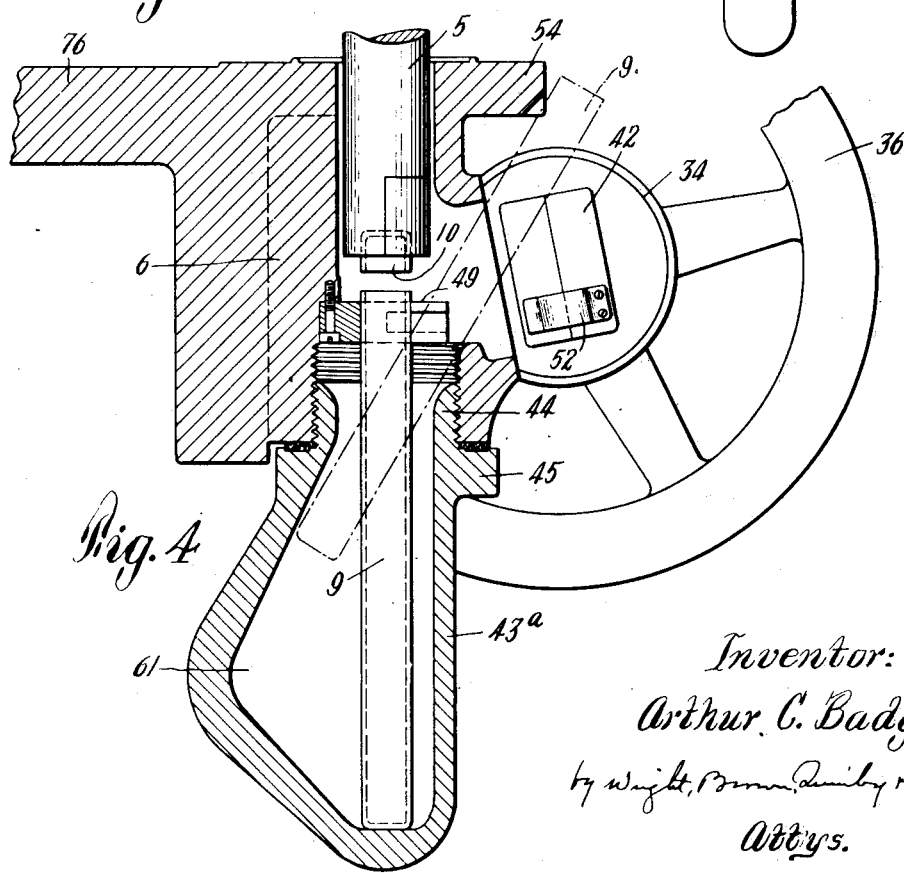
Fig. 4 is a sectional view similar to Fig. 2, but showing a different form of bottom closure for the chambered electrode.

The previously described adjustment of the electrode 5 and substitution for the plug 47 of other, longer or shorter, plugs accommodate cartridges of various lengths within a certain range. To accommodate cartridges so long as to be outside of this range, closing pieces of greater lengths or of greater length and different form may be substituted. One such is shown in Fig. 4 at 43a, which is mounted in the electrode body in the same way as the piece 43 and is closed at the bottom and formed with an offset 61 at the side opposite to the entrance opening of the chamber so that a very long cartridge may be passed into it when inclined as it must be to pass through the doorway.

Metal cartridges of bottle-like form, too large to be placed wholly inside of the chambered electrode, such as that shown in Figs. 5, 6 and 9, are inserted as to their neck portions only through the bottom of the electrode. The closing piece is removed from the electrode and a bushing 62 substituted. Such bushing is threaded externally to fit the threads in the electrode and internally to fit threads in the neck 63 of the bottle 64. It also has an external flange 65 which is packed leakage tight with the electrode by a washer 66 and with the shoulder of the bottle by a washer 67. The bottle is supported from underneath by a bottom rest 68 on the upper end of a screw 69 which is threaded through a nut 70 supported by a bracket 71 on the frame 7. A worm gear 72 surrounds the nut 71 and meshes with a worm 73 on a shaft 74 journaled in the bracket 71 and to which is secured a hand wheel 75.

The chambered electrode is provided with horizontal and vertical lugs 76 and 77 which are screwed tightly to the upper outer corner of the supporting frame 7. It is made in one piece, with its lugs, out of copper. The angle frame 7 is a massive copper casting and it is bolted tightly to a base plate 78 of copper which is secured mechanically to the outer side of the base 1 and to which the terminal 79 of the secondary coil of the transformer is secured in good conducting connection. As the clamps 49 and 50 for the smaller cartridge bodies, the substitute bushing 62 for the larger bottles, and the electrode 5 and its clamp 15 are all copper, a low resistance path for the secondary current of the transformer is provided at all points except the point of contact between the cartridge body and its cover when the two are brought together, which is the condition required for electric welding.

The electrical connections and controls involve nothing new with this invention, but are shown by way of illustration in Fig. 10. The secondary circuit, having the terminals 11 and 79 previously mentioned, is designated as a whole by S, the primary coil or coils by P, and the core by C. A relay switch 80 is interposed in one of the power leads to the primary coil and is controlled by an electro magnet or solenoid 81 in circuit with a source 82 of low voltage electric current and with a primary switch 83 controlled by a treadle 84 or other suitable means adapted to be actuated at will by the operator of the machine. Preferably the same treadle controls a belt shipper 85 (Fig. 1) by which a power belt is shifted from the loose pulley to the driving pulley 21, and vice versa, in a known way, so that when the treadle is depressed the mechanical and electrical means for making the weld are put in action simultaneously.

It will be apparent from the foregoing description that in using this machine to fill and seal hollow cartridges or the like, the cartridge, if small enough to be placed bodily in the chambered electrode, is placed therein through the lateral opening, and the cap is applied to the plunger electrode, the latter being withdrawn. The cover 34 is then closed. The compressed fluid with which the cartridge is to be charged, whether liquid carbon dioxide or any other gas under pressure, either liquefied or in the gaseous state, is admitted to the chambered electrode until the desired pressure is attained. The entire space within the chambered electrode, including the interior of the cartridge and its cap, is filled with the fluid. The operator, by depressing the treadle, then causes the plunger electrode to bring the cap against the rim of the cartridge body and causes a powerful current of low voltage to flow through the secondary transformer circuit and to make a weld between the cartridge body and cap. This being completed, the fluid in the chambered electrode is released, or pumped back to a container through pipe 32, the cover door opened and the filled and sealed cartridge removed.

In case the cartridge is one of the type shown in Fig. 5, the procedure differs only in that it is screwed in through the bottom of the chambered electrode and upheld by its support 65. Caps of the same character and dimensions preferably are used with all types and dimensions of cartridge, the cartridges of large sizes having a lip 86 surrounding the entrance, as shown in Fig. 5, which is of the same dimensions as to diameter and thickness as the flange of the cover. It is essential to the making of a satisfactory weld that the walls or lip surrounding the filling opening be accurately alined and matched with the flange of the cover, and this is effected by the centering and holding means here shown and by the coaxial alinement of the two electrodes.

What I claim and desire to secure by Letters Patent is:

1. A welding machine comprising a supporting frame, complemental electrodes mounted on said frame in the secondary circuit of a transformer, one of said electrodes having an interior chamber and the other electrode entering said chamber, an insulating packing surrounding the last named electrode in the entrance to the chambered electrode, and means for effecting relative movement between said electrodes.

2. An electric welding machine comprising a frame, a chambered work holder adapted to receive a hollow body to be sealed, an electrode entering said work holder and having means for carrying a sealing cap, insulating packing means between said electrode and the entrance to said chamber adapted to prevent leakage of fluid through said entrance and to separate the electrode electrically from the work holder, an electrical transformer having a secondary winding in terminal connection with said work holder and electrode, and means for effecting relative movement between said electrode and work holder in a manner such as to effect contact between the body contained in the work holder and the cap carried by the electrode.

3. In an electric welding machine, a hollow fitting in electrical connection with the welding circuit and constituting both an electrode and a holder adapted to receive in its interior the mouth of an open hollow article to be welded, said fitting having an external connection for conducting fluid into its interior and being constructed to prevent escape of the fluid at the time of welding, and a complemental electrode entering the fitting.

4. In an electric welding machine, the combination of an electrode constructed as a hollow fitting having an interior chamber, an entrance at one end for a complemental welding electrode and an opening at the opposite end adapted to receive the mouth portion of a hollow metal body.

5. In an electric welding machine, the combination of an electrode constructed as a hollow fitting having an interior chamber, an entrance at one end for a complemental welding electrode, and an opening at the opposite end adapted to receive the mouth portion of a hollow metal body, said fitting having also a lateral opening and a door detachably mounted to fit over and close said opening.

6. In an electric welding machine, an electrode comprising a hollow fitting having an entrance opening at one end for a complemental electrode, an opening at the opposite end, and a lateral opening, a closing member detachably secured over the second opening, and a door for the lateral opening.

7. In an electric welding machine, an electrode comprising a hollow fitting having an entrance at one end for a complemental electrode, an opening at the opposite end, and a lateral opening, a closing member detachably secured over the second opening, a yoke crossing said lateral opening connected at its ends to the fitting at points on opposite sides of the opening, a screw shaft threaded through said yoke in axial alinement with the opening, and a door secured to said shaft in position to cover and close the opening.

8. In a welding machine, a combined electrode and work holder comprising a hollow fitting having an entrance for a complemental electrode, a lateral opening, a removable door covering said lateral opening, and an internal clamp for embracing the article to be welded, said clamp comprising a stationary member secured within the fitting and a complemental movable member arranged to be forced toward such article by said door when the latter is in place.

9. In an electric welding machine, a combined electrode and work holder comprising a fitting having an interior chamber adapted to receive a hollow body to be welded and having a lateral opening and an entrance at one end for an electrode, a clamp member secured in the interior of said fitting at the side thereof away from the lateral opening adapted to bear on the side of such hollow body, a complemental movable clamp member arranged to bear on the opposite side of the hollow body, and a door detachably mounted to cover said lateral opening, said movable clamp having an extension arranged to be pressed upon by said door to force the clamp member against the article to be welded.

10. In a welding machine, a work holding means comprising a hollow electrode fitting having an entrance at its upper end for a complemental electrode, and an opening at its lower end to receive the end of an article to be welded, a support for such article mounted below the hollow electrode fitting, and means for raising and lowering said support to insert the article into the bottom opening of the electrode fitting and to withdraw it therefrom.

11. In a welding machine of the character described, an electrode adapted to carry a cap member to be welded over the mouth of a hollow body, said electrode being cut away at one side at its end, and a clamp member secured yieldingly to the cut away side of the electrode, the electrode body and clamp member having complemental parts of a socket in their adjacent sides to receive such cap.

12. In an electric welding machine of the character set forth, an electrode adapted to carry a cap for attachment by welding to a hollow body, said electrode having a partial socket at one side of its end to receive such cap and a clamp having a complemental partial socket secured to the side of the electrode and yieldingly pressed toward such side.

13. A electric welding machine comprising a base, a rigid frame of electrically conductive metal projecting from said base, a chambered electrode in electrical connection with said frame adapted to receive at least the mouth portion of a hollow metal container and to make electrically conductive contact therewith and exclude leakage of fluid under pressure, an arm overhanging said frame, a carrier mounted to slide up and down on said frame, a plunger electrode secured to said carrier and entering the chambered electrode, said plunger electrode having means for holding a cap for the said container in alinement with the mouth of the container, a stuffing box secured to the chambered electrode and electrically insulated therefrom, surrounding the plunger electrode and preventing leakage of compressed fluid past the same, means for delivering compressed fluid to the interior of said chambered electrode, means for connecting said electrodes in an electric welding circuit, and means for imparting movement to the plunger electrode endwise through the stuffing box.

14. An electric welding machine for the purposes set forth comprising complemental electrodes connected in an electric welding circuit, one of said electrodes having an interior chamber and the other being a plunger entering said chamber, the chambered electrode having a stuffing box mechanically secured to and electrically insulated from it, surrounding and making a substantially leakage tight joint with the plunger electrode, means for moving said plunger electrode endwise, means in the chambered electrode for holding a metallic bottle or cartridge with its mouth portion directed toward the inner end of the plunger electrode and in the line of movement thereof, and in electrically conductive connection with the chambered electrode, the plunger electrode having resilient means for grasping a cover, making electrical contact with the cover, and holding the cover in alinement with the mouth of the cartridge.

15. An electric welding machine of the character set forth comprising complemental electrodes connected to opposite terminals of an electric welding circuit and insulated from each other, one of said electrodes being hollow and having a packed entrance passage through which the other enters movably, said hollow electrode having a lateral opening and another opening opposite to the second electrode, a displaceable door for covering said lateral opening and a detachable plug closing the other opening and protruding toward the second electrode for supporting the article to be welded while being welded.

16. In an electric welding machine of the character described, a hollow electrode in current receiving connection with an electric welding circuit, having a passage at one end for entrance of a complemental electrode and an opening at the opposite end, a closure for the last named opening detachably secured thereto and having a detachable plug projecting inward toward said passage.

17. In an electric welding machine of the character described, a hollow electrode in current receiving connection with an electric welding circuit, having a passage at one end for entrance of a complemental electrode and an opening at the opposite end, a closure comprising a hollow closing piece open at one end and detachably secured at its open end to the electrode in register with the open end thereof; the electrode having also a lateral opening for admission thereinto and into the hollow closing piece of articles to be welded, and a displaceable door for closing said lateral opening.

18. In an electric welding machine of the character described, a hollow electrode in current receiving connection with an electric welding circuit, having a passage at one end for entrance of a complemental electrode and an opening at the opposite end, a closure comprising a hollow closing piece open at one end and detachably secured at its open end to the electrode in register with the open end thereof; the electrode having also a lateral opening for admission thereinto and into the hollow closing piece of articles to be welded, and a displaceable door for closing said lateral opening, the closing piece having an offset or enlargement in its side opposite to said lateral opening to provide a passageway for the accommodation of long work pieces.

19. In an electric welding machine of the character described, a hollow welding electrode in connection with an electrical welding circuit having an entrance at one end for a complemental electrode and an opening opposite to said entrance for receiving the mouth portion of a hollow article to be welded, means for admitting fluid under pressure to the interior of said hollow electrode, packing means in said entrance for preventing leakage of fluid past said complemental electrode, and packing means between the walls of the opposite opening and the inserted portion of said hollow article to prevent leakage of fluid past the latter.

In testimony whereof I have affixed my signature.

ARTHUR C. BADGER.